UNITED STATES PATENT OFFICE.

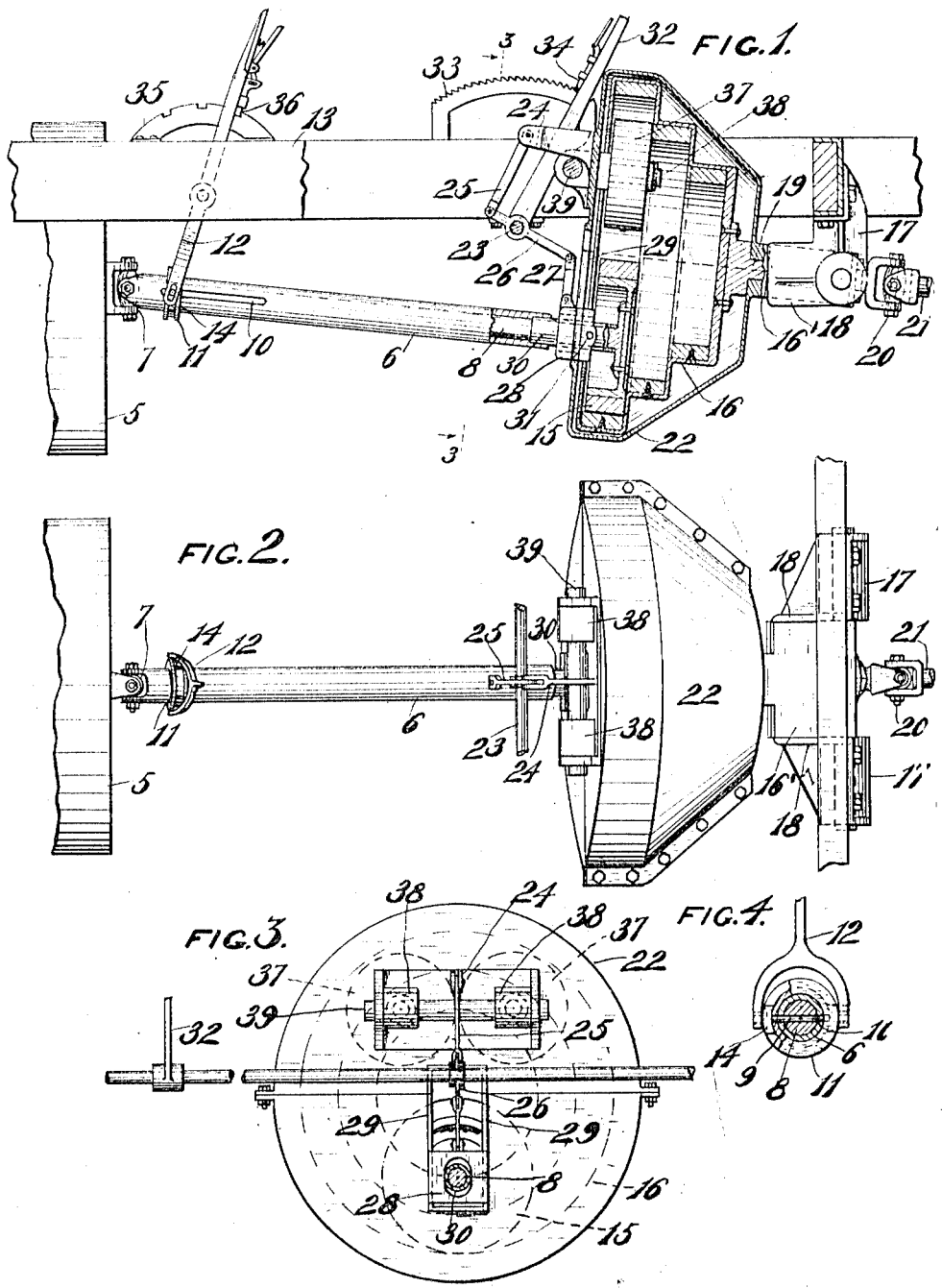

ANDREW ASTRUP, OF MILWAUKEE, WISCONSIN.

SPEED-CHANGING GEARING.

964,141.  Specification of Letters Patent.  Patented July 12, 1910.

Application filed October 14, 1909. Serial No. 522,566.

*To all whom it may concern:*

Be it known that I, ANDREW ASTRUP, residing in Milwaukee, in the county of Milwaukee and State of Wisconsin, have invented new and useful Improvements in Speed-Changing Gearing, of which the following is a description, reference being had to the accompanying drawings, which are a part of this specification.

This invention relates to improvements in speed changing gearing, and more particularly to that class of speed changing gears used in connection with automobiles, motor boats etc.

One of the objects of this invention is to provide a speed changing gearing which is simple in construction and operation and is inexpensive to manufacture.

A further object of the invention is to provide a speed changing gearing of the step gearing type in which motion is transmitted by frictional contact of the gears.

A further object of the invention is to provide a speed changing gearing in which the direction of rotation of the driven shaft may be reversed.

A further object of the invention is to provide means whereby the frictional engagement means may be separated when desired.

With the above and other objects in view, the invention consists of the speed changing gearing and its parts and combinations, and all equivalents thereof.

In the accompanying drawing, in which the same reference characters indicate the same parts in all of the views; Figure 1 is a side view of the speed changing gear attached to a supporting frame, parts broken away and other parts being in section to show interior construction; Fig. 2 is a plan view of the gearing; Fig. 3 is a sectional view taken on line 3—3 of Fig. 1, and, Fig. 4 is a transverse section of the sleeve and shaft.

Referring to the drawing the numeral 5 indicates the fly wheel of an engine and 6 a sleeve connected thereto by a universal joint 7. A shaft 8 extending into the sleeve is keyed thereto by means of a bolt 9 projecting from the shaft and extending through longitudinal slots 10 provided in the sleeve and into a grooved collar 11 surrounding said sleeve. An operating lever 12 pivoted to the frame 13 and provided with a bifurcated lower end which straddles the sleeve collar and is provided with shoes 14 which engage the groove of the collar is adapted to move the shaft longitudinally in the sleeve and permit the rotation of both the shaft and sleeve.

The outer end of the shaft is provided with a friction driving wheel 15 which is adapted to be moved into frictional engagement with different steps of a stepped frictional wheel 16 having its bearing in a journal block 16′ pivotally connected to the frame. The brackets 17, depending from the frame and to which the journal block 16′ is pivotally connected, are provided with forwardly projecting flanges 18 against which the flat sides of the journal block 16′ bear to prevent lateral movement thereof. The shaft 19 of the stepped wheel extends through the journal block and is provided with a universal coupling connection 20 from which extends a shaft 21 leading to the propelling wheels of the vehicle. The stepped wheel is closed in a casing 22 the rear end of which is carried by the journal block 16′ and the said stepped wheel at its front end is supported on the transverse rock shaft 23 by a link and lever connection. An arm 24 projects from the front portion of the casing and is pivotally connected to the link 25 and the lower end of the link is pivotally connected to the short arm of the lever 26 rigidly connected to the transverse shaft 23. A short link 27 pivotally connected at its upper end to the long arm of the lever 26 is pivotally connected at its lower end to a block 28 slidably mounted on ways 29 provided on the casing 22. A short sleeve 30 surrounds the lower end of the driving shaft 8 and extends through an opening in the block 28 and is pivotally connected thereto by pivot pins 31. The rock shaft 23 is turned to raise the friction wheel 15 and lower the stepped wheel 16 by means of the lifting lever 32 and the lever is held in adjusted position by the segmental rack 33 and the pawl 34. The operating lever 12 is also held in positions of adjustment in a similar manner by means of a segmental rack 35 and a locking dog 36.

Reversing wheels 37 mounted on stud pins 38 which are pivotally connected to the casing are positioned within the casing immediately below the upper portion of the step of the greatest diameter of the stepped wheel and are adapted to reverse the direction of rotation of the stepped wheel when the driving wheel 15 is swung into contact with the reversing wheels and the reversing wheels are swung into contact with the stepped wheel. The stud pins are pivotally and independently mounted on a transverse rod 39 and extend through openings into the casing to serve as journals for the friction wheels.

The operation of the gearing is as follows; assuming that the parts are in the position shown in the drawing, motion will be transmitted from the engine to the sleeve and shaft connected thereto, and the friction wheel on the end of the shaft will engage the outer step of the stepped wheel and drive the driven shaft at the minimum rate of speed. If it is now desired to reverse the direction of rotation the lifting lever is swung forwardly to the left, to turn the rock shaft and the lever connected thereto. This movement will raise the driving shaft by means of the link connection with the long arm of the lever and the sliding block and at the same time lower the casing by means of the link connection with the short arm of the rock shaft lever until the friction wheel is in engagement with the reversing wheels and they have been swung in contact with the stepped wheel. In this position the driven shaft will be rotated in a reverse direction. If it is now desired to stop the rotation of the driven shaft, the lifting lever is swung rearwardly to separate the stepped wheel from the reverse wheels and the friction wheel from the reverse wheels so that the friction wheel will run idle.

To change the speed of rotation of the driven shaft, the lifting lever is turned to raise the friction wheel from the step of the stepped wheel with which it is in engagement and the operating lever is turned to slide the friction wheel in position to engage the next step. When in proper position the lifting lever is turned in the opposite direction to move the friction wheel into contact with the step. In the different adjustments the levers are held in position by the pawl and dog engaging the segmental racks.

In starting the rotation of the driven shaft, the frictional contact of the friction wheel with the stepped wheel may be adjusted by means of the lifting lever in order to start easily.

The faces of the friction wheel and the steps of the stepped wheel may be formed of any width desired and are preferably covered with wood or other material to provide the requisite amount of friction desired.

From the foregoing it will be seen that the gearing is very simple in construction and operation and is inexpensive to manufacture.

What I claim as my invention is:

1. Speed changing gearing, comprising a stepped wheel, a wheel adapted and constructed to engage the steps of the stepped wheel, means for moving the wheel into position to engage one of the steps of the stepped wheel, and means for moving both wheels laterally and into operative engagement with each other.

2. Speed changing gearing, comprising a stepped wheel, a wheel adapted and constructed to engage the steps of the stepped wheel, a reversing wheel positioned to engage the stepped wheel and be engaged by the other wheel, and means for moving the stepped wheel and the other wheel into operative engagement with the reversing wheel.

3. Speed changing gearing, comprising a laterally movable stepped wheel, a wheel adapted and constructed to engage the steps of the stepped wheel, a shaft upon which said wheel is mounted, means for moving said shaft longitudinally to move the wheel into position to engage one of the steps of the stepped wheel, and means for moving the shaft and the stepped wheel laterally to move the stepped wheel and the other wheel into operative engagement with each other.

4. Speed changing gearing, comprising a stepped wheel mounted in a pivoted bearing, a friction wheel adapted and constructed to be moved into engagement with the steps of said stepped wheel, a shaft upon which said wheel is mounted, a sleeve surrounding said shaft, means for moving said shaft longitudinally to position the friction wheel so it may be moved into contact with the steps of the stepped wheel, and means for moving both the stepped wheel and the friction wheel toward each other and into frictional engagement.

5. Speed changing gearing, comprising a stepped wheel mounted in a pivoted bearing, a friction wheel adapted and constructed to be moved into engagement with the steps of said stepped wheel, a shaft upon which said wheel is mounted, a sleeve surrounding said shaft, means for moving said shaft longitudinally to position the friction wheel so it may be moved into contact with the steps of the stepped wheel, a casing surrounding said stepped gear, a block surrounding the shaft and slidably mounted on the casing, and a lever for sliding the block to move the friction wheel into engagement with the stepped wheel.

6. Speed changing gearing, comprising a stepped wheel mounted in a pivoted bearing, a friction wheel adapted and constructed to be moved into engagement with the steps of said stepped wheel, a shaft upon which said wheel is mounted, a sleeve surrounding said shaft, means for moving said shaft longitudinally to position the friction wheel so it may be moved into contact with the steps of the stepped wheel, a casing surrounding said stepped gear, a block slidably mounted on the casing, a sleeve surrounding the shaft and pivotally connected to the block, and a lever having a linked connection with the block for sliding the block to move both the stepped wheel and the friction wheel toward each other and into frictional engagement.

7. Speed changing gearing, comprising a stepped wheel mounted in a pivotal bearing, a casing for said wheel, stud shafts pivotally connected to said casing and extending into the casing, friction reversing wheels mounted on the stud shafts and positioned adjacent to the inner surface of the stepped wheel, a transverse shaft, a lever, a link connection between one end of the lever and the casing, a block slidably mounted on the casing, a link connection between the block and the other end of the lever, a sleeve pivotally connected to the block, a shaft slidably and revolubly mounted in the sleeve and positioned to engage the steps of the stepped wheel, means for moving said shaft longitudinally, and means for rotating said shaft.

8. Speed changing gearing, comprising a stepped wheel mounted in a pivotal bearing, a casing for said wheel, stud shafts pivotally connected to said casing and extending into the casing, friction reversing wheels mounted on the stud shafts and positioned adjacent to the inner surface of the stepped wheel, a transverse shaft, a lever, a link connection between one end of the lever and the casing, a block slidably mounted on the casing, a link connection between the block and the other end of the lever, a sleeve pivotally connected to the block, a shaft slidably and revolubly mounted in the sleeve, a friction wheel mounted on the shaft and positioned to engage the steps of the stepped wheel, a slotted sleeve surrounding the shaft and having a universal joint connection with a motion transmitting means, a collar surrounding said slotted sleeve, a connection between the shaft and the collar extending through the slot of the sleeve, and a lever for sliding the collar to change the position of the friction wheel.

In testimony whereof, I affix my signature, in presence of two witnesses.

ANDREW ASTRUP.

Witnesses:
O. C. H. KEENEY,
ALMA A. KLUG.